(12) United States Patent
Huang et al.

(10) Patent No.: US 10,243,243 B2
(45) Date of Patent: Mar. 26, 2019

(54) BATTERY AND CHARGING METHOD

(71) Applicant: Lenovo (Beijing) Co., Ltd., Beijing (CN)

(72) Inventors: Baoning Huang, Beijing (CN); Bingcai Luo, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 23 days.

(21) Appl. No.: 15/479,361

(22) Filed: Apr. 5, 2017

(65) Prior Publication Data

US 2018/0006337 A1    Jan. 4, 2018

(30) Foreign Application Priority Data

Jun. 30, 2016  (CN) .......................... 2016 1 0510004
Jun. 30, 2016  (CN) .......................... 2016 1 0514021
Jun. 30, 2016  (CN) .......................... 2016 1 0514392

(51) Int. Cl.
H02J 7/04        (2006.01)
H02J 7/16        (2006.01)
H01M 10/44       (2006.01)
H01M 2/08        (2006.01)
H01M 2/34        (2006.01)
H01M 10/04       (2006.01)
H01M 10/46       (2006.01)
H02J 7/00        (2006.01)

(52) U.S. Cl.
CPC .......... H01M 10/446 (2013.01); H01M 2/08 (2013.01); H01M 2/34 (2013.01); H01M 10/0431 (2013.01); H01M 10/46 (2013.01); H02J 7/007 (2013.01); H02J 7/0029 (2013.01); H02J 2007/0037 (2013.01)

(58) Field of Classification Search
CPC ...... H02J 7/0081; H02J 7/0073; H01M 10/44; Y02E 60/12; Y02B 40/90
USPC ........................................................ 320/148
See application file for complete search history.

(56) References Cited

U.S. PATENT DOCUMENTS 5,686,815 A  * 11/1997 Reipur ............... G01R 31/3613
                                                    320/116
9,735,599 B2 *  8/2017 Alessandro ........... H02J 7/0052
2004/0142237 A1*  7/2004 Asano ................. H01M 2/0285
                                                    429/161
2004/0164711 A1   8/2004 Hayashi
2007/0075682 A1*  4/2007 Guang ................. H02J 7/0077
                                                    320/128

(Continued)

FOREIGN PATENT DOCUMENTS

CN        1815798 A       8/2006
CN      101807805 A       8/2010

(Continued)

Primary Examiner — Arun C Williams
(74) Attorney, Agent, or Firm — Anova Law Group, PLLC

(57) ABSTRACT

A battery includes a cell including a core and a sealing film enclosing the core. The core includes a negative electrode plate, a metal plate, a separator, and a positive electrode plate arranged successively. The battery further includes a protection circuit coupled to the negative electrode plate and one of the metal plate or the positive electrode plate to measure a reference voltage between the negative electrode plate and the one of the metal plate or the positive electrode plate.

20 Claims, 9 Drawing Sheets

(56) References Cited

U.S. PATENT DOCUMENTS

| | | | | |
|---|---|---|---|---|
| 2010/0066309 | A1* | 3/2010 | Labrunie | H01M 10/4264 320/141 |
| 2012/0319653 | A1* | 12/2012 | Kumar | H02J 7/0013 320/118 |
| 2015/0321575 | A1* | 11/2015 | Sakatani | H02J 7/1423 320/109 |
| 2015/0357622 | A1* | 12/2015 | Mune | H01G 11/50 429/163 |
| 2015/0380966 | A1* | 12/2015 | Alessandro | H02J 7/0052 320/107 |

FOREIGN PATENT DOCUMENTS

| | | |
|---|---|---|
| CN | 102593539 A | 7/2012 |
| CN | 102946131 A | 2/2013 |
| CN | 103000962 A | 3/2013 |
| CN | 103427108 A | 12/2013 |
| CN | 103427131 A | 12/2013 |
| CN | 203910934 U | 10/2014 |
| CN | 104967200 A | 10/2015 |
| CN | 104979591 A | 10/2015 |
| CN | 105098268 A | 11/2015 |
| CN | 105449165 A | 3/2016 |
| EP | 0807826 A2 | 11/1997 |

* cited by examiner

BATTERY AND CHARGING METHOD

CROSS-REFERENCE TO RELATED APPLICATIONS

This application claims priority to Chinese Patent Application Nos. 201610514021.4, 201610510004.3, and 201610514392.2, all filed on Jun. 30, 2016, the entire contents of all of which are incorporated herein by reference.

TECHNICAL FIELD

The present disclosure relates to batteries and battery charging technology and, more particularly, to a battery, a fast charging method, and an electronic apparatus.

BACKGROUND TECHNOLOGIES

Electronic apparatuses have been more and more widely used. Electronic apparatuses, especially those capable of being quickly charged, such as smart phones and tablets, have brought much convenience to people's daily life.

In conventional technologies, a battery of an electronic apparatus, e.g., a smart phone or a tablet, may include a positive electrode plate, a negative electrode plate, and a separator, i.e., a separating membrane, placed between the positive electrode plate and the negative electrode plate. The separator separates the positive electrode plate and the negative electrode plate, preventing them from touching each other to cause short circuit.

When the battery is charged, a voltage between the positive electrode plate and the negative electrode plate, i.e., a difference between an electric potential of the positive electrode plate and an electric potential of the negative electrode plate, can be acquired. However, the electric potential of the negative electrode plate is unknown. During the charging process, the electric potential of the negative electrode plate may be 0V (volt). In this situation, crystallization may occur at the negative electrode plate, forming metal crystal on the negative electrode plate. The metal crystal may pierce the separator, causing a short circuit between the positive electrode and negative electrode plates. This may damage the battery and injure the user of the electronic apparatus.

SUMMARY

In accordance with the disclosure, there is provided a battery including a cell including a core and a sealing film enclosing the core. The core includes a negative electrode plate, a metal plate, a separator, and a positive electrode plate arranged successively. The battery further includes a protection circuit coupled to the negative electrode plate and one of the metal plate or the positive electrode plate to measure a reference voltage between the negative electrode plate and the one of the metal plate or the positive electrode plate.

Also in accordance with the disclosure, there is provided a charging method including acquiring a charging current for charging a battery, determining whether a reference voltage of the battery is lower than a limiting voltage, and increasing the charging current to a maximum current in response to the reference voltage being lower than the limiting voltage.

Also in accordance with the disclosure, there is provided an electronic apparatus including a processor and a memory coupled to the processor. The memory stores instructions that, when executed by the processor, cause the processor to acquire a charging current for charging a battery, determine whether a reference voltage of the battery is lower than a limiting voltage, and increase the charging current to a maximum current in response to the reference voltage being lower than the limiting voltage.

DESCRIPTION OF EMBODIMENTS

Figure 1:
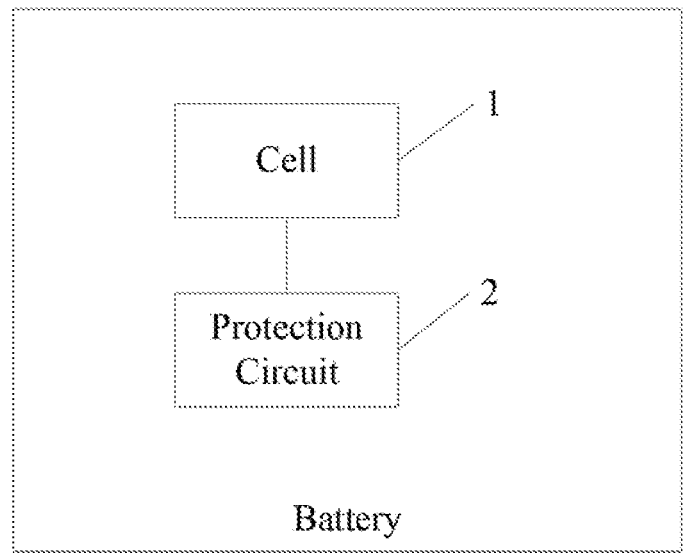
FIG. 1 schematically shows a block diagram of a battery consistent with some embodiments.

Hereinafter, embodiments of the disclosure will be described with reference to the drawings, which are merely examples for illustrative purposes and are not intended to limit the scope of the disclosure. Wherever possible, the same reference numbers will be used throughout the drawings to refer to the same or like parts.

The embodiments described below are merely part rather than all of the embodiments of the disclosure. All other embodiments that can be derived by one of ordinary skill in the art based on the disclosed embodiments without inventive effort are within the scope of the disclosure.

Embodiments of the disclosure include a battery, a fast charging method, and an electronic apparatus. According to some embodiments, an electric potential at a negative electrode plate of the battery can be acquired, which can be used for avoiding potential risk caused by, for example, battery crystallization.

Battery crystallization refers to a phenomenon involving crystalline particles forming at the negative electrode plate of the battery during charging of the battery. This may occur in various types of batteries, such as lithium-ion batteries. The positive electrode plate of a lithium-ion battery usually includes an active compound containing lithium and the negative electrode plate of the lithium-ion battery usually includes carbon having a specific molecular structure, such as a sheet molecular structure in which the carbon atoms are arranged in sheets. A common positive electrode material for the lithium-ion battery is lithium cobalt oxide ($LiCoO_2$). During charging, the voltage applied across two terminals of the battery can force the compound in the positive electrode plate to release lithium ions, which can move to the negative electrode plate and enter into the carbon in the negative electrode plate that has the sheet molecular structure. When the electric potential of the negative electrode plate reaches 0V, no more lithium ions can enter the carbon in the negative electrode plate. At this time, if the charging continues, the excessive lithium ions will accumulate on the negative electrode plate, forming crystal. That is, the crystallization at the negative electrode plate of the battery is caused by overcharging the battery.

Consistent with some embodiments, a battery can include a cell and a protection circuit. The cell can include a core, which can include a negative electrode plate, a first metal plate, a first separator, a positive electrode plate, and a second separator. The core can include, for example, a wound core as described below or a flat core that is not wound. In the embodiments below, a wound core is described as an example, but the concepts disclosed here can also apply to the battery having another type of core, such as a core without winding.

The first metal plate and the negative electrode plate can be used to generate a voltage. The voltage between the first metal plate and the negative electrode plate can also be referred to as an "internal voltage." The protection circuit can be coupled to the first metal plate and the negative electrode plate to acquire the internal voltage. A value of the internal voltage can indicate the electric potential of the negative electrode plate. As such, the electric potential of the negative electrode plate can be acquired and can be used to control the charging of the battery to avoid crystallization at the negative electrode plate, thus avoiding the risk of damaging the battery when crystal formed at the negative electrode plate pierces the separator.

FIG. 1 schematically shows a block diagram of a battery consistent with some embodiments. The battery includes a cell 1 and a protection circuit 2.

Figure 2:
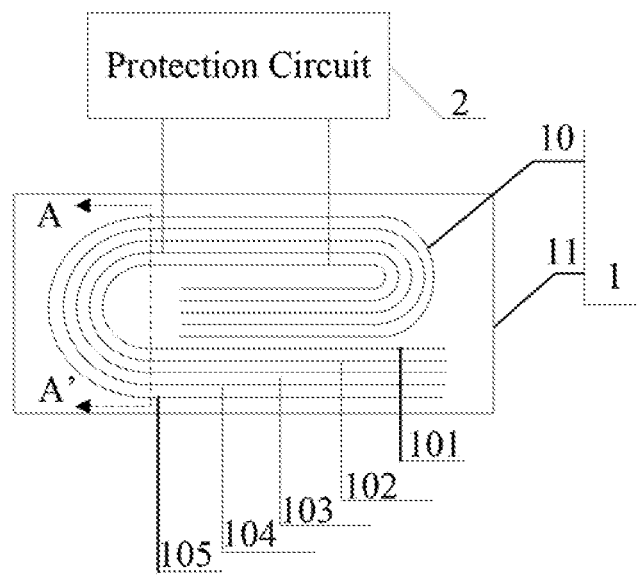
FIG. 2 schematically shows a structural diagram of an example of battery consistent with some embodiments.

FIG. 2 schematically shows a structural diagram of an example of battery 100 consistent with some other embodiments. In the battery 100, the cell 1 includes a wound core 10 and a sealing film 11. The sealing film 11 encloses the wound core 10. FIG. 2 includes a plan view of the wound core 10. As shown in FIG. 2, the wound core 10 includes a negative electrode plate 101, a first metal plate 102, a first separator 103, a positive electrode plate 104, and a second separator 105 that are wound together. An internal voltage can be generated between the first metal plate 102 and the negative electrode plate 101.

The protection circuit 2 is coupled to the first metal plate 102 and the negative electrode plate 101, and can acquire the internal voltage between the first metal plate 102 and the negative electrode plate 101. A value of the internal voltage indicates an electric potential of the negative electrode plate 101.

Figure 3:
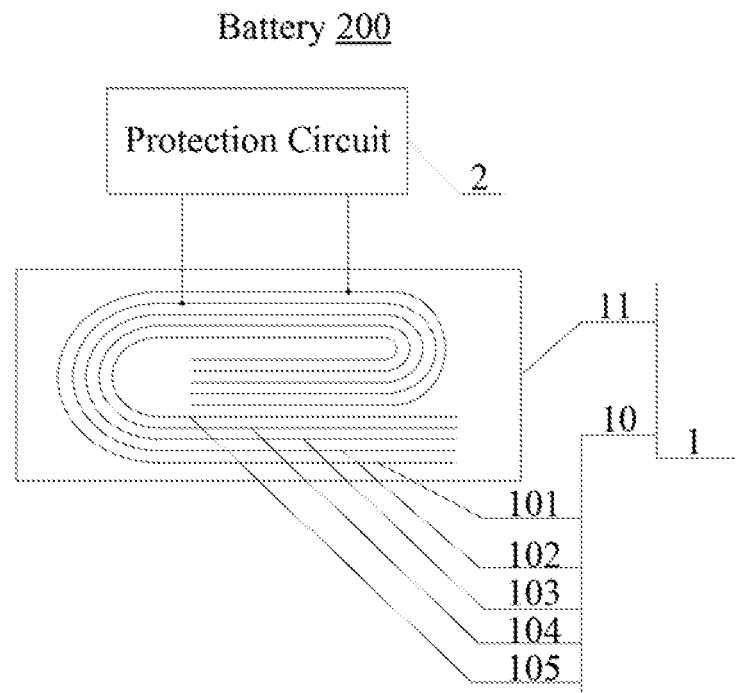
FIG. 3 schematically shows a structural diagram of another example of battery consistent with some embodiments.

In the example shown in FIG. 2, the negative electrode plate 101, the first metal plate 102, the first separator 103, the positive electrode plate 104, and the second separator 105 are arranged from the inner side of the wound core 10 to the outer side of the wound core 10 in that order. In some other embodiments, these layers can be arranged in different orders. For example, FIG. 3 schematically shows a structural diagram of another example of battery 200 consistent with some other embodiments. The battery 200 differs from the battery 100 in that, the negative electrode plate 101, the first metal plate 102, the first separator 103, the positive electrode plate 104, and the second separator 105 are arranged from the outer side of the wound core 10 to the inner side of the wound core 10 in that order.

The order and arrangement of the first metal plate 102, the first separator 103, the positive electrode plate 104, and the second separator 105 are not limited to those shown in FIGS. 2 and 3. For example, the first metal plate 102 can be arranged between other layers, rather than between the negative electrode plate 101 and the first separator 103 shown in FIGS. 2 and 3. Further, in some embodiments, a third separator can be added between the negative electrode plate 101 and the metal plate 102 to better protect the battery.

Moreover, in the examples shown in FIGS. 2 and 3, the wound core 10 is wound in a shape consisting of arcs (semi-circles) and straight lines. In some other embodiments, the wound core 10 can also be wound in a circular shape or an elliptical shape, or another shape.

As described above, the protection circuit 2 is coupled to the first metal plate 102 and the negative electrode plate 101 to acquire (measure) the internal voltage between the first metal plate 102 and the negative electrode plate 101. Depending on how the protection circuit 2 is coupled to the first metal plate 102 and the negative electrode plate 101, the voltage reading of the protection circuit 2 can be positive or negative. In some embodiments, the negative electrode plate 101 can be coupled to the protection circuit 2 as a positive terminal and the first metal plate 102 can be coupled to the protection circuit 2 as a negative terminal. In these embodiments, the polarity of the voltage reading of the protection circuit 2 and the polarity of the internal voltage are the same. For example, a negative voltage reading by the protection circuit 2 indicates that the internal voltage has a negative value. In some other embodiments, the negative electrode plate 101 can be coupled to the protection circuit 2 as a negative terminal and the first metal plate 102 can be coupled to the protection circuit 2 as a positive terminal. In these embodiments, the polarity of the voltage reading of the protection circuit 2 and the polarity of the internal voltage opposite to each other. For example, a negative voltage reading by the protection circuit 2 indicates that the internal voltage has a positive value.

A battery consistent with the embodiments, such as the battery shown in FIG. 1, 2, or 3, can be a lithium-ion battery or a different type of battery. If the battery is a lithium-ion battery, a material for the negative electrode plate 101 can include, e.g., carbon or an alloy. A material for the first metal plate 102 can include, e.g., aluminum, copper, or another metal material. A material for the first separator 103 and/or the second separator 105 can include, e.g., polypropylene or polyethylene. A material for the positive electrode plate 104 can include, e.g., a lithium-containing compound, such as lithium cobalt oxide ($LiCoO_2$). The sealing film 11 can include, e.g., a composite film, such as an aluminum-plastic composite film.

As discussed above, overcharging can cause crystallization on the negative electrode plate of a battery. Below, formation of crystal on the negative electrode plate 101 is described as an example.

During the charging process of the battery, the voltage applied across the two terminals of the battery force the compound in the positive electrode plate 104 that contains lithium ions to release the lithium ions. The electric field between the negative electrode plate 101 and the positive electrode plate 104 drive the lithium ions to move to the structure of the negative electrode plate 101, which cause the electric potential of the negative electrode plate 101 to gradually increase with respect to the first metal plate 102. In some embodiments, the electric potential of the first metal plate 102 is 0V. The protection circuit 2 is coupled to the negative electrode plate 101 and the first metal plate 102, and acquires the voltage between the negative electrode plate 101 and the first metal plate 102, i.e., the internal voltage. When the electric potential of the negative electrode plate 101 with respect to the first metal plate 102 is lower than 0V, lithium ions can enter into the negative electrode plate 101 normally. When the battery is charged to a certain extent, i.e., when the voltage between the negative electrode plate 101 and the first metal plate 102 is higher than or equal to 0V, lithium ions cannot enter into the structure of the negative electrode plate 101. Further charging will cause the lithium ions to attach and accumulate on the surface of the negative electrode plate 101, resulting in crystallization. Further, when the amount of lithium ions accumulated on the surface of the negative electrode plate 101 reaches a certain value, the crystal formed by the accumulated lithium ions may pierce the first separator 103. As a result, the negative electrode plate 101 may be directly connected with the positive electrode plate 104, causing a short circuit in the battery.

Therefore, consistent with some embodiments, the voltage between the negative electrode plate 101 and the first metal plate 102 can be controlled to prevent crystallization at the negative electrode plate 101 of the battery during the charging process.

Further, in some embodiments, as shown in FIGS. 2 and 3, the first metal plate 102 is arranged between the negative electrode plate 101 and the first separator 103 to prevent the crystal formed on the negative electrode plate 101 from piercing the first separator 103 to form a short circuit with the positive electrode plate 104. That is, arranging the first metal plate 102 between the negative electrode plate 101 and the first separator 103 can further enhance the effect of preventing the crystal formed on the negative electrode plate 101 from piercing the first separator 103. As such, even if crystal is formed on the negative electrode plate 101 during the charging process, the crystal nevertheless cannot pierce the first metal plate 102, and thus will not form an electrical connection between the negative electrode plate 101 and the positive electrode plate 104.

Figure 4A:
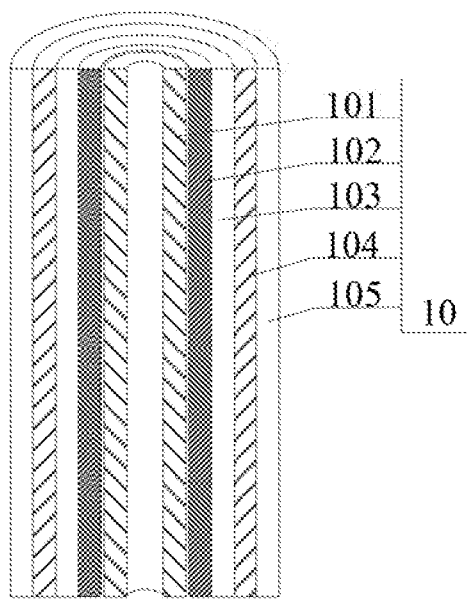
FIGS. 4A and 4B are cross-sectional views of examples of wound core consistent with some embodiments.

FIG. 4A is a cross-sectional view of the wound core 10 shown in the plan view in FIG. 2 along line A-A'. As shown in FIG. 4A, the negative electrode plate 101, the first metal plate 102, the first separator 103, the positive electrode plate 104, and the second separator 105 are arranged from the inner side of the wound core 10 to the outer side of the wound core 10 in that order. In some embodiments, the negative electrode plate 101 and the first metal 102 need to be separated from each other, e.g., to prevent a short circuit therebetween. As shown in FIG. 4A, the negative electrode plate 101 and the first metal 102 are separated from each other by a gap.

Figure 4B:
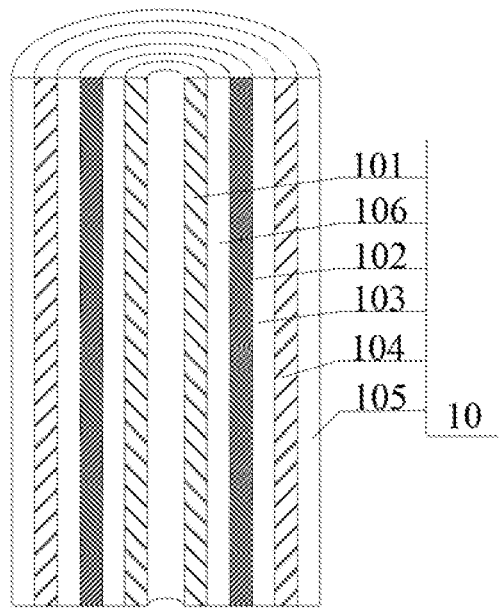

Other means can also be used to separate the negative electrode plate 101 and the first metal 102. FIG. 4B shows a cross-sectional view of another example of the wound core 10. In the example shown in FIG. 4B, a third separator 106 is added between the negative electrode plate 101 and the first metal plate 102. That is, as shown in FIG. 4B, the negative electrode plate 101, the third separator 106, the first metal plate 102, the first separator 103, the positive electrode plate 104, and the second separator 105 are arranged from the inner side of the wound core 10 to the outer side of the wound core 10 in that order.

Figure 5:
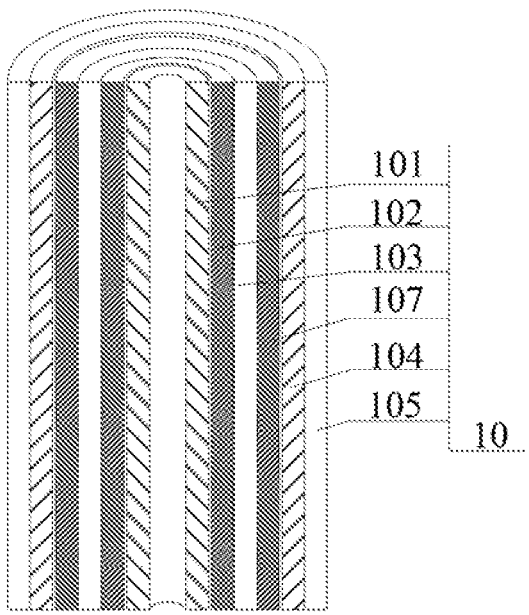
FIG. 5 is a cross-sectional view of another example of wound core consistent with some embodiments.

The structure of the wound core 10 of the battery is not limited to that shown in FIGS. 2, 3, 4A, and 4B, and one or more other layers can be added to the wound core 10. FIG. 5 is a cross-sectional view of another example of the wound core 10 consistent with some embodiments. The wound core 10 shown in FIG. 5 is similar to the wound core 10 shown in FIG. 4A, except that the wound core 10 in FIG. 5 further includes a second metal plate 107 arranged between the first separator 103 and the positive electrode plate 104. That is, in the example shown in FIG. 5, the layers in the wound core 10 from the inner side to the outer side are, successively, the negative electrode plate 101, the first metal plate 102, the first separator 103, the second metal plate 107, the positive electrode plate 104, and the second separator 105.

Figure 6:
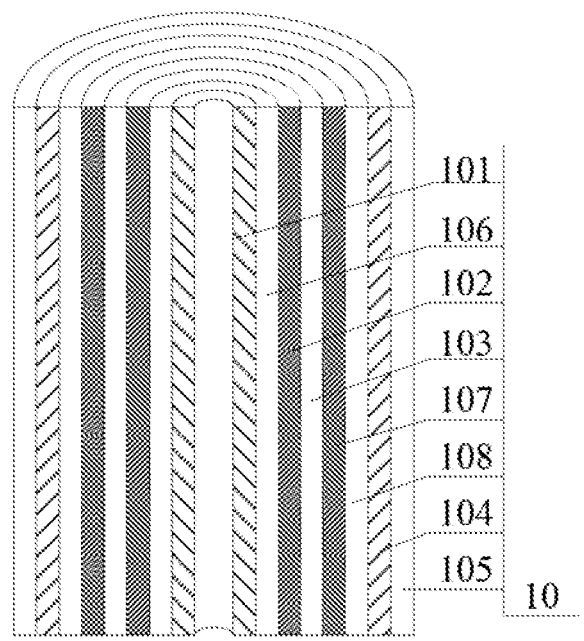
FIG. 6 is a cross-sectional view of another example of wound core consistent with some embodiments.

FIG. 6 is a cross-sectional view of another example of the wound core 10 consistent with some embodiments. The wound core 10 shown in FIG. 6 is similar to the wound core 10 shown in FIG. 4B, except that the wound core 10 in FIG. 6 further includes the second metal plate 107 and a fourth separator 108 arranged between the first separator 103 and the positive electrode plate 104. That is, in the example shown in FIG. 6, the layers in the wound core 10 from the inner side to the outer side are, successively, the negative electrode plate 101, the third separator 106, the first metal plate 102, the first separator 103, the second metal plate 107, the fourth separator 108, the positive electrode plate 104, and the second separator 105.

In some embodiments, the wound core 10 may include more or less layers than the examples shown in FIGS. 4A, 4B, 5, and 6. For example, the wound core 10 can include, from the inner side to the outer side, the negative electrode plate 101, the first metal plate 102, the first separator 103, the second metal plate 107, the fourth separator 108, the positive electrode plate 104, and the second separator 105.

As described above, the crystal formed on the negative electrode plate 101 may pierce the first separator 102. Sometimes, burrs on the negative electrode plate 101 or the positive electrode plate 104 may also pierce the first separator 102. Burrs may result from machining the negative electrode plate 101 or the positive electrode plate 104 due to, for example, limits in the machining process. If burrs exist on the negative electrode plate 101 or the positive electrode plate 104 and no metal plate is placed between the negative electrode plate 101 and the positive electrode plate 104, the burrs may pierce the first separator 103, causing short circuit. Using a wound core consistent with the embodiments, such as the wound core 10 shown in FIG. 6, may prevent the crystal formed on the negative electrode plate 101 or the burrs on the negative electrode 101 or the positive electrode 104 from piercing the first separator 103, and thus improving the safety of the battery.

Examples of charging method will be described below. In some embodiments, the protection circuit 2 can acquire a threshold voltage and the internal voltage between the first metal plate 102 and the negative electrode plate 101, and determine whether the internal voltage is higher than or equal to the threshold voltage. If the internal voltage is higher than or equal to the threshold voltage, a responsive protection mechanism is invoked to prevent crystallization on the negative electrode plate 101.

In some embodiments, the responsive protection mechanism includes that the protection circuit 2 generates a suspension instruction when the internal voltage is higher than or equal to the threshold voltage. The suspension instruction instructs a charging control chip of an electronic apparatus having the battery to stop charging the battery, i.e., the charging process is suspended. As such, crystallization on the negative electrode plate 101 can be effectively avoided.

For example, the threshold voltage can be set to 0V. If the internal voltage between the negative electrode plate 101 and the first metal plate 102, acquired by the protection circuit 2, is 0V, i.e., equal to the threshold voltage 0V, then the protection circuit 2 can generate the suspension instruction and send the suspension instruction to the charging control chip of the electronic apparatus using the battery. The charging control chip can control a power adapter to stop powering the battery. As such, no lithium ions will continue to accumulate on the negative electrode plate 101. Therefore, no crystalline will happen on the surface of the negative electrode plate 101, and the battery can be protected.

Figure 7:
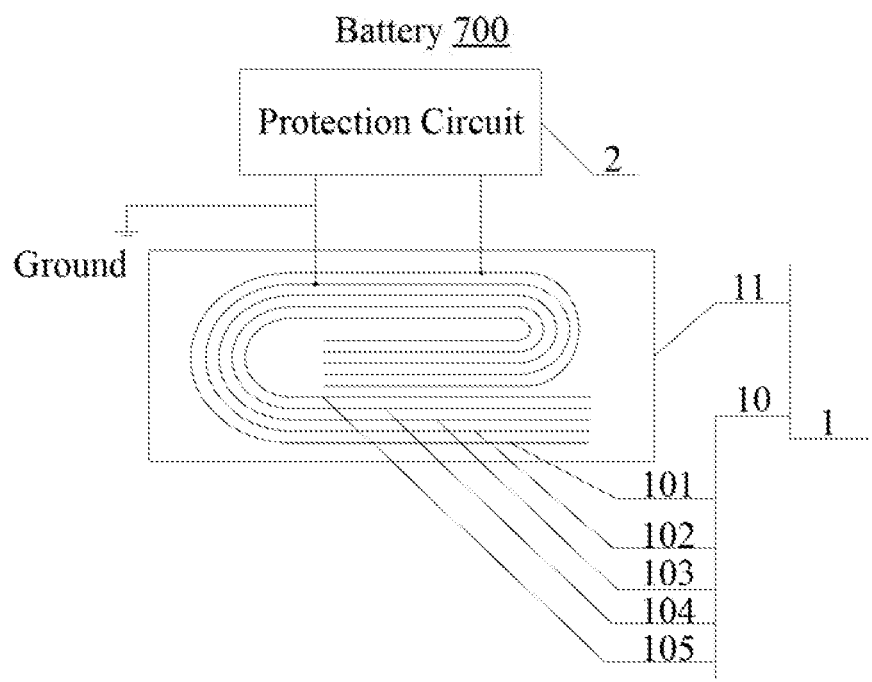
FIG. 7 schematically shows a structural diagram of another example of battery consistent with some embodiments.

In some embodiments, the first metal plate 102 can be coupled to the ground (a ground terminal) to fix the electric potential of the first metal plate 102 to 0V, such that the voltage between the negative electrode plate 101 and the first metal plate 102 equals the electric potential of the negative electrode plate 101. For example, FIG. 7 schematically shows a structural diagram of another example of battery 700 consistent with some other embodiments. The battery 700 is similar to the battery 200 shown in FIG. 3, except that in the battery 700, the first metal plate 102 is coupled to the ground. Similarly, in the battery 100 shown in FIG. 2, the first metal plate 102 can also be coupled to the ground. As shown in FIG. 5, one terminal of the protection circuit 2 is coupled to the negative electrode plate 101 and the other terminal of the protection circuit 2 is coupled to the first metal plate 102. The voltage measured by the protection circuit 2 is the voltage between the negative electrode plate 101 and the first metal plate 102.

In the example described above, the voltage acquired by the protection circuit is the electric potential of the negative electrode plate minus the electric potential of the first metal plate. Since the electric potential of the first metal plate is 0V, the voltage acquired by the protection circuit equals the electric potential of the negative electrode plate. In some other embodiments, the voltage acquired by the protection circuit can be the electric potential of the first metal plate minus the electric potential of the negative electrode plate. In these embodiments, the electric potential of the negative electrode plate equals the negative of the voltage acquired by the protection circuit.

As described above, in some embodiments, the threshold voltage can be 0V. When the protection circuit 2 determines that the voltage between the first metal plate 102 and the negative electrode plate 101 is 0V, it can be determined that the electric potential of the negative electrode plate 101 is also 0V. In this situation, further charging may cause crystallization at the negative electrode plate 101. Thus, the protection circuit 2 can send a suspension instruction to the electronic apparatus charging the battery to instruct the electronic apparatus to stop charging the battery. This can prevent crystallization at the negative electrode plate 101 from happening, and hence avoid the short circuit resulting from the crystal piercing the first separator 103.

In the examples described above, the threshold voltage is set to 0V. The threshold voltage is not necessarily set to 0V but can be preset according to practical need. For example, the threshold voltage can be a negative value. In some embodiments, the threshold voltage can be chosen from the range of [−1.5V, 0V] in the scenario that the voltage acquired by the protection circuit 2 equals the electric potential of the negative electrode plate 101 minus the electric potential of the first metal plate 102. In some other embodiments, the threshold voltage can be a voltage between about 0.01V and about 0.05V.

In the examples described above, charging of the battery is suspended when the internal voltage is higher than or equal to the threshold voltage. In some other embodiments, other protection mechanisms can be implemented to protect the battery. For example, another protection mechanism consistent with some embodiments includes the protection circuit 2 generating a lowering instruction when the internal voltage between the first metal plate 102 and the negative electrode plate 101 is higher than or equal to the threshold voltage. The lowering instruction instructs the charging control chip of the electronic apparatus having the battery to reduce a charging current for the battery, so as to prevent crystallization from happening at the negative electrode plate 101 of the battery.

In the scenario that the threshold voltage is set to 0V, when the voltage between the negative electrode plate 101 and the first metal plate 102 that is acquired by the protection circuit 2 is 0V, i.e., equaling the threshold voltage 0V, the protection circuit 2 can generate the lowering instruction and send the lowering instruction to the charging control chip of the electronic apparatus having the battery. The charging control chip controls the power adapter to reduce the charging current provided to the battery. As such, no lithium ions will continue to accumulate at the negative electrode plate 101. Thus, crystal will not be formed on the surface of the negative electrode plate 101, and the battery can be protected.

An example of the charging process consistent with some embodiments will be described below. When the internal voltage between the negative electrode plate 101 and the first metal plate 102 is higher than or equal to the threshold voltage, the charging current of the battery can be reduced from a maximum current to a first preset current, to cause a battery voltage of the battery during the charging process to reduce below a maximum battery voltage of the battery. The maximum battery voltage refers to the highest voltage that the battery can sustain, which can be, for example, about 4.2V. The charging current is the current provided by the power adapter during a charging process. The maximum current can be a largest current that the battery can sustain or a largest current that the power adapter can provide. When the battery voltage is reduced to below the maximum battery voltage and equals a first preset battery voltage, the charging current can be increased from the first preset current to the maximum current, e.g., the largest current that the power adapter can provide.

In some embodiments, reducing the charging current from the maximum current to the first preset current can include the protection circuit 2, when determining that the internal voltage between the negative electrode plate 101 and the first metal plate 102 is higher than or equal to the threshold voltage, storing this determination result (the internal voltage being higher than or equal to the threshold voltage) in the protection circuit 2. The charging control chip of the electronic apparatus using the battery can access the determination result stored in the protection circuit 2. When the charging control chip obtains the determination result, the charging control chip can control the power adapter to reduce the charging current of the battery to the first preset current.

In some other embodiments, the determination result of the protection circuit 2 can trigger a pin of the charging control chip to switch to a low potential level or to a high potential level, such that the charging control chip can control the power adapter to reduce the charging current of the battery to the first preset current.

Then, when the internal voltage between the negative electrode plate 101 and the first metal plate 102 again becomes higher than or equal to the threshold voltage, the charging current can be reduced from the maximum current to a second preset battery voltage, to cause the battery voltage of the battery during the charging process to reduce below the maximum battery voltage. The second preset current can be smaller than the first preset battery voltage. When the battery voltage becomes lower than the maximum battery voltage and equals a second preset battery voltage, the charging current can again be increased from the second preset current to the maximum current, e.g., the largest current that the power adapter can provide. The second preset battery voltage can be higher than the first preset battery voltage.

In some embodiments, reducing the charging current from the maximum current to the second preset battery voltage can include the protection circuit 2 generating a lowering instruction when the internal voltage between the negative electrode plate 101 and the first metal plate 102 is higher than or equal to the threshold voltage and sending the lowering instruction to the charging control chip of the electronic apparatus having the battery, such that the charging control apparatus can control the power adapter to reduce the charging current provided to the battery.

Figure 8:
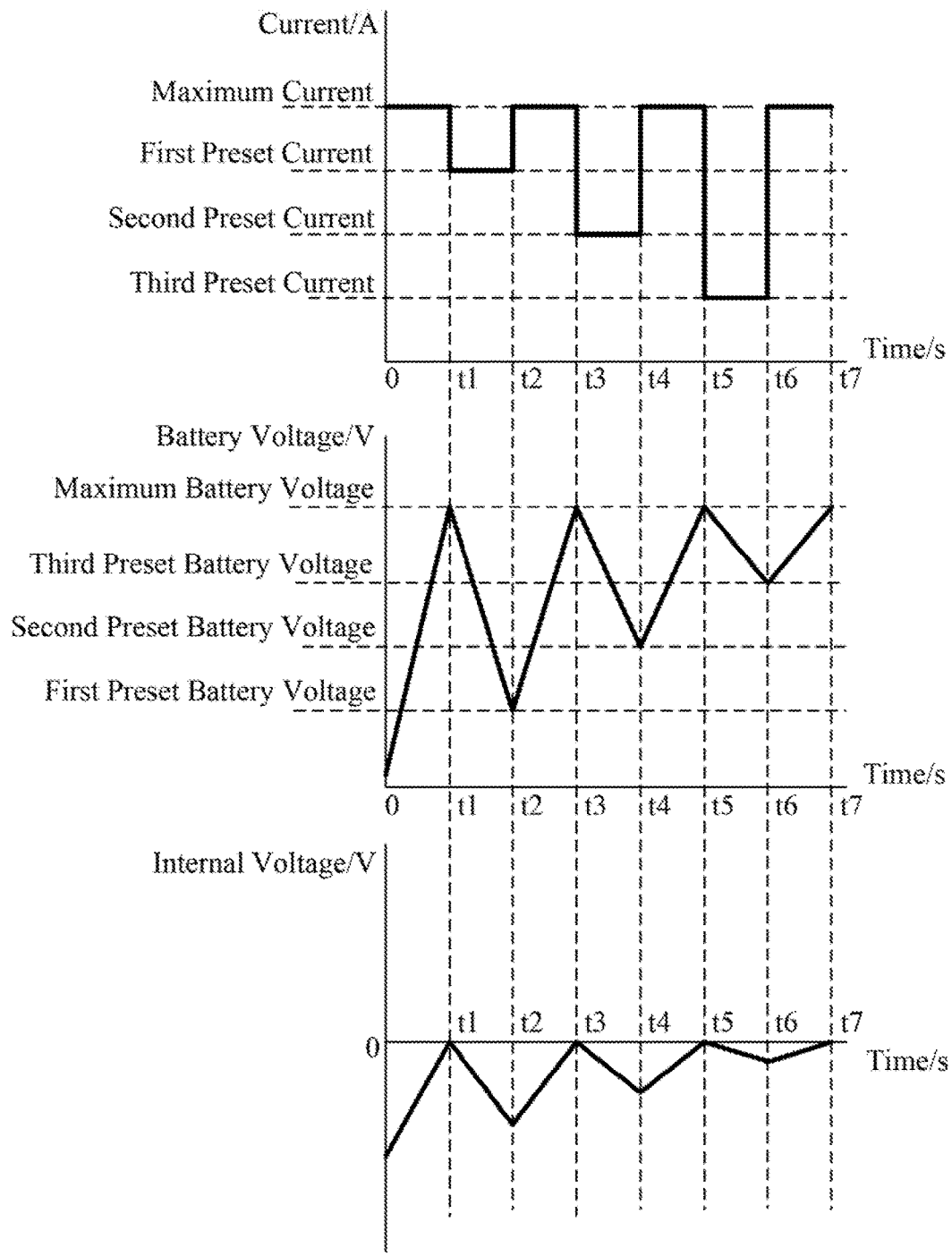
FIG. 8 shows charts illustrating change of various parameters over time during a battery charging process consistent with some embodiments.

Hereinafter, an example of the battery charging process consistent with some embodiments will be described in more detail with reference to FIG. 8. FIG. 8 shows charts that illustrate the change of various parameters over time during the battery charging process. Specifically, the top, middle, and bottom charts of FIG. 8 show the change of the charging current, the battery voltage, and the internal voltage between the negative electrode plate 101 and the first metal plate 102, respectively, over time during the battery charging process.

When the charging begins, the battery may be in an empty state, i.e., the amount of lithium ions in the negative electrode plate 101 is relatively small. Thus, the electric potential of the negative electrode plate 101 with respect to the first metal plate 102 is lower than 0V. Therefore, during an initial time period, i.e., the time period from 0 to t1 shown in FIG. 8, the charging current is set to the maximum current, e.g., the largest current that the power adapter can provide, as shown in the top chart in FIG. 8. During this period, the voltage applied across the positive electrode plate 104 and the negative electrode plate 101 cause the positive electrode plate 104 to gradually release the lithium ions, which move to the structure of the negative electrode plate 101 as driven by the electric field between the positive electrode plate 104 and the negative electrode plate 101. The lithium ions arriving at the negative electrode plate 101 cause the electric potential of the negative electrode plate 101 to gradually increase with respect to the first metal plate 102 from a negative value, e.g., about −1.5V, to about 0V, as shown in the bottom chart in FIG. 8. Meanwhile, as shown in the middle chart in FIG. 8, the battery voltage, i.e., the voltage between the positive electrode plate 104 and the negative electrode plate 101, increases from a voltage at the empty state, also referred to as an "empty-state battery voltage," to the maximum battery voltage, i.e., the highest voltage that the battery can sustain, which can be, e.g., about 4.2V.

At time t1, if the battery continues to be charged at the maximum current, crystal may be formed on the surface of the negative electrode plate 101. Thus, to prevent crystallization so as to protect the battery, when the internal voltage increases to be higher than or equal to 0V, the protection circuit 2 of the battery can invoke a responsive protection mechanism, to either suspend the charging or reduce the charging current. In FIG. 8, the embodiment using the current-reducing mechanism is shown, as described in more detail below.

As shown in the top chart in FIG. 8, at time t1, the charging current is reduced to the first preset current and the battery is charged at the first preset current during the time period from t1 to t2. During this time period, the lithium ions that accumulate on the surface of the negative electrode plate 101 during the time period from 0 to t1 gradually enter into the structure of the negative electrode plate 101. Thus, during the time period from t1 to t2, the internal voltage between the negative electrode plate 101 and the first metal plate 102 decreases below the threshold voltage, i.e., below 0V. However, since the battery has been charged for a certain period of time, the internal voltage between the negative electrode plate 101 and the first metal plate 102 will not decrease to the voltage value when the battery is in the empty state, also referred to as an "empty-state internal voltage." Rather, the internal voltage decreases to a voltage value between the empty-state internal voltage and the threshold voltage, as shown in the bottom chart in FIG. 8. Similarly, the battery voltage also decreases below the maximum battery voltage. However, since the battery has been charged for a certain period of time, the battery voltage will not decrease to the empty-state battery voltage when the charging begins. Rather, the battery voltage decreases to the first preset battery voltage, as shown in the middle chart in FIG. 8.

In the process described above, the maximum current is applied in the initial stage of the charging process to realize fast charging. During this process, the protection circuit 2 monitors the voltage between the negative electrode plate 101 and the first metal plate 102. When this voltage reaches 0V, the charging current is reduced to protect the battery. Thus, safe and effective charging can be realized.

After the above process, the battery is in a safe state. Thus, when the battery voltage decreases to the first preset battery voltage, to fast charge the battery, the protection circuit 2 increases the charging current from the first preset current. That is, as shown in the top chart in FIG. 8, during the time period from t2 to t3, the battery is charged at the maximum current, e.g., the largest current that the power adapter can provide. Consequently, during the time period from t2 to t3, the battery voltage gradually increases to the maximum battery voltage, e.g., about 4.2V, as shown in the middle chart in FIG. 8. Further, during the time period from t2 to t3, the internal voltage between the negative electrode plate 101 and the first metal plate 102 also gradually increases to about 0V, as shown in the bottom chart in FIG. 8.

At time t3, if the battery continues to be charged at the maximum current, crystal may be formed on the surface of the negative electrode plate 101. Thus, to prevent crystallization, the protection circuit 2 of the battery can invoke a responsive protection mechanism again, to either suspend the charging or reduce the charging current. In FIG. 8, the embodiment using the current-reducing mechanism is shown, as described in more detail below.

As shown in the top chart in FIG. 8, at time t3, the charging current is reduced to the second preset current, which is smaller than the first preset current, and the battery is charged at the second preset current during the time period from t3 to t4. Since the negative electrode plate 101 has received more lithium ions, the concentration of lithium ions in the negative electrode plate 101 gradually increases and the speed of receiving lithium ions gradually decreases. During the time period from t3 to t4, the battery voltage decreases below the maximum battery voltage, as shown in the middle chart in FIG. 8. However, since the battery has been charged for a certain period of time, the battery voltage will not decrease to the first preset battery voltage. Rather, the battery voltage decreases to the second preset battery voltage, which is higher than the first preset battery voltage. Further, the internal voltage between the negative electrode plate 101 and the first metal plate 102 decreases from 0V, which prevents crystallization from happening at the negative electrode plate 101.

After the above process, the battery is in a safe state. Thus, when the battery voltage decreases to the second preset battery voltage, to fast charge the battery, the protection circuit 2 increases the charging current. That is, as shown in the top chart in FIG. 8, during the time period from t4 to t5, the battery is charged at the maximum current, e.g., the largest current that the power adapter can provide. Consequently, during the time period from t4 to t5, the battery voltage gradually increases to the maximum battery voltage, e.g., about 4.2V, as shown in the middle chart in FIG. 8. Further, during the time period from t4 to t5, the internal voltage between the negative electrode plate 101 and the first metal plate 102 also gradually increases to about 0V, as shown in the bottom chart in FIG. 8.

At time t5, if the battery continues to be charged at the maximum current, crystal may be formed on the surface of the negative electrode plate 101. Thus, to prevent crystallization, the protection circuit 2 of the battery can invoke a responsive protection mechanism again, to either suspend the charging or reduce the charging current. In FIG. 8, the embodiment using the current-reducing mechanism is shown, as described in more detail below.

As shown in the top chart in FIG. 8, at time t5, the charging current is reduced to a third preset current, which is smaller than the second preset current, and the battery is charged at the third preset current during the time period from t5 to t6. During the time period from t5 to t6, the battery voltage decreases below the maximum battery voltage to a third preset battery voltage, as shown in the middle chart in FIG. 8. The third preset battery voltage is higher than the second preset battery voltage. Further, the internal voltage between the negative electrode plate 101 and the first metal plate 102 decreases from 0V, which prevents crystallization from happening at the negative electrode plate 101.

After the above process, the battery is in a safe state. Thus, when the battery voltage decreases to the third preset battery voltage, to fast charge the battery, the protection circuit 2 increases the charging current. That is, as shown in the top chart in FIG. 8, during the time period from t6 to t7, the battery is charged at the maximum current, e.g., the largest current that the power adapter can provide. Consequently, during the time period from t6 to t7, the battery voltage gradually increases to the maximum battery voltage, e.g., about 4.2V (or about 3V in some embodiments), as shown in the middle chart in FIG. 8. Further, during the time period from t6 to t7, the internal voltage between the negative electrode plate 101 and the first metal plate 102 also gradually increases to about 0V, as shown in the bottom chart in FIG. 8.

At time t7, if the battery continues to be charged at the maximum current, crystal may be formed on the surface of the negative electrode plate 101. Thus, to prevent crystallization, the protection circuit 2 of the battery can invoke a responsive protection mechanism again, to either suspend the charging or reduce the charging current.

The above charging process can be repeated to reduce the charging current in a step form and to increase the battery voltage in a step form, causing the battery voltage to gradually approach the maximum battery voltage. The time periods during the charging process, such as the time periods 0-t1, t1-t2, t2-t3, t3-t4, t4-t5, t5-t6, and t6-t7 shown in FIG. 8 may or may not be equal to each other.

By using one or more of the technical solutions described above, the internal voltage between the negative electrode plate 101 and the first metal plate 102 can be monitored, and the charging current can be controlled based on the internal voltage. As such, the battery can be fast charged and also be charged safely.

Figure 9:
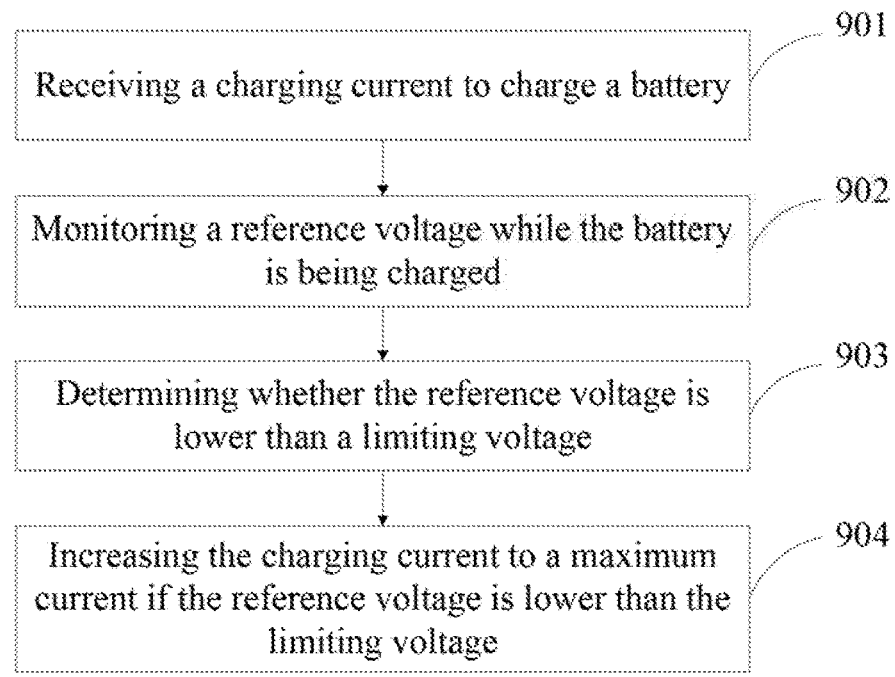
FIG. 9 is a flow chart of an example of fast charging method consistent with some embodiments.

FIG. 9 is a flow chart of an example of fast charging method consistent with some embodiments. The method can be implemented in an electronic apparatus. That is, the electronic apparatus can be the entity that executes the method.

As shown in FIG. 9, at 901, a charging current is received to charge a battery. The charging current is provided by a power adapter coupled to the electronic apparatus. The battery has a limiting voltage. At 902, a reference voltage is monitored while the battery is being charged. At 903, whether the reference voltage is lower than a limiting voltage is determined based on the reference voltage and the limiting voltage. At 904, if the reference voltage is lower than the limiting voltage, the charging current is increased to a maximum current. The maximum current can be a largest current that the battery can sustain or a largest current that the power adapter can provide. Charging speed can be increased by charging at the maximum current. In some embodiments, the initial value of the charging current at the beginning of the charging process can be set to the maximum current to increase the charging speed.

The limiting voltage refers to a voltage corresponding to a charging current that is too large and may damage the battery. That is, when the reference voltage is higher than or equal to the limiting voltage, the battery may be damaged because of the excessively large charging current. Therefore, during the charging process, the reference voltage can be maintained to be lower than or equal to the limiting voltage to protect the battery.

The above disclosed method can be applied to a lithium-ion battery consistent with the embodiments, or an ordinary battery such as an ordinary lithium-ion battery or a different type of battery. In some embodiments, the reference voltage can be the battery voltage described above, i.e., the voltage across the positive electrode plate and the negative electrode plate of the battery, and the limiting voltage can be a battery voltage of a certain value at which the charging current is large enough to possibly damage the battery. The method implementing the battery voltage as the reference voltage can be applied to any type of battery, including one of the lithium-ion batteries described in this disclosure or another type of battery. The limiting voltage may depend on the type of the battery. For example, for an ordinary lithium-ion battery, the limiting voltage can be about 3.0V to about 4.4V.

In some other embodiments, the reference voltage can be the internal voltage described above, i.e., the voltage between the negative electrode plate and the first metal plate, and the limiting voltage can be the threshold voltage described above. The first metal plate can be placed at any position in the wound core 10, e.g., can be between any two other layers in the wound core 10. For example, the first metal plate 102 can be arranged between the negative electrode plate 101 and the first separator 103 as shown in FIGS. 2, 3, 4A, 5, and 7, or between the third separator 106 and the first separator 103 as shown in FIGS. 4B and 6. In some other embodiments, the wound core can have a different structure, as described below.

Figure 10:
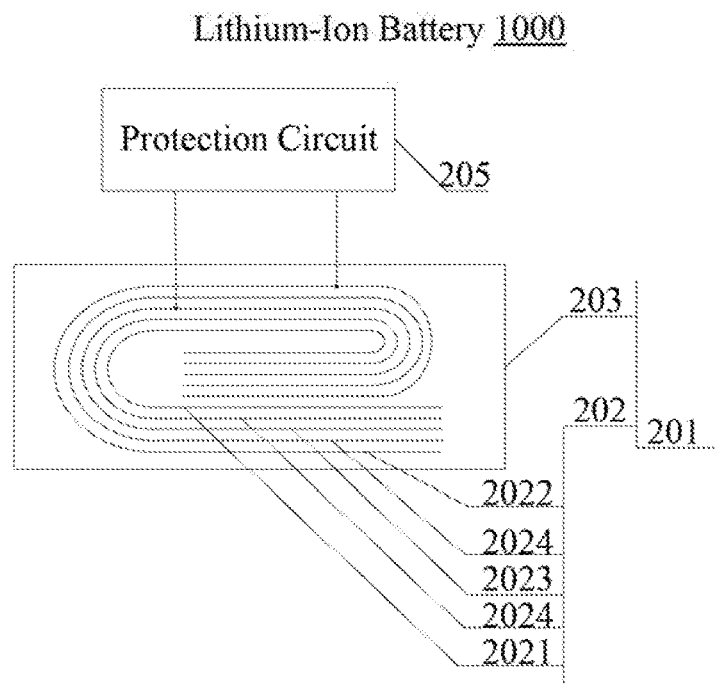
FIG. 10 schematically shows another example of lithium-ion battery consistent with some embodiments.

FIG. 10 schematically shows an example of lithium-ion battery 1000 consistent with some embodiments. As shown in FIG. 10, the lithium-ion battery 1000 includes a cell 201, which includes a wound core 202. The wound core 202 includes a positive electrode 2021, a negative electrode 2022, and a metal electrode 2023 arranged between the positive electrode 2021 and the negative electrode 2022. The metal electrode 2023 can be made of a metal that is resistant to alkalic corrosion, such as aluminum or copper. The cell 201 further includes a sealing film 203 enclosing the wound core 202. The sealing film 203 can be made of an aluminum-plastic composite film. The wound core 202 further includes two separators 2024 to prevent short circuit. One of the separators 2024 is arranged between the positive electrode 2021 and the metal electrode 2023 and the other one of the separators 2024 is arranged between the metal electrode 2023 and the negative electrode 2022.

The lithium-ion battery 1000 further includes a protection circuit 205 for acquiring the reference voltage when the lithium-ion battery 1000 is being charged. In the example shown in FIG. 10, the protection circuit 205 is coupled to the metal electrode 2023 and the negative electrode 2022, and thus measures the internal voltage between the metal electrode 2023 and the negative electrode 2022. Further, the electric potential at the metal electrode 2023 is 0V, and thus the connection scheme shown in FIG. 10 can relatively accurately measure the electric potential at the negative electrode 2022 of the lithium-ion battery (10X), so as to prevent the crystallization from happening when the electric potential of the negative electrode 2022 reaches 0V.

For the lithium-ion battery 1000 shown in FIG. 10, the reference voltage can refer to the internal voltage between the metal electrode 2023 and the negative electrode 2022, which can be in the range from about −1.5V to about 0V. In some embodiments, the voltage reading of the protection circuit 205 is an absolute value and the internal voltage can be obtained by reversing the plus/minus sign of the voltage reading of the protection circuit 205. Further, for the lithium-ion battery 1000, the limiting voltage can be the threshold voltage above which lithium crystallization may occur at the negative electrode 2022 due to the excessively large charging current. The limiting voltage can be, for example, 0V or smaller than 0V.

In some embodiments, after the battery is charged at the maximum current and when the reference voltage reaches the limiting voltage, the charging current can be reduced from the maximum current, causing the reference voltage to reduce below the limiting voltage. For example, when the reference voltage reaches the limiting voltage, the charging current can be reduced from the maximum current to a first preset current, causing the reference voltage to reduce below the limiting voltage. When the reference voltage reduces to a first preset voltage lower than the limiting voltage, the charging current can be increased from the first preset current to the maximum current.

By applying the above-described limiting, the reference voltage can be maintained to be not higher than the limiting voltage. This can ensure that the battery not be damaged due to an excessively high charging current. Meanwhile, since the maximum current is used for charging when appropriate, the charging speed can be improved. When the reference voltage reaches the limiting voltage, the charging current can be reduced from the maximum current, causing the reference to reduce below the limiting voltage. That is, after the charging current is increased to the maximum current, or when the charging current is maintained at the maximum current, the reference voltage will increase during the charging process. When the reference voltage equals the limiting voltage, the charging current can be reduced from the maximum current to cause the reference voltage to reduce below the limiting voltage, preventing the battery from being damaged by an excessively high charging current. Further, for a lithium-ion battery, maintaining the reference voltage at or below the limiting voltage can also prevent lithium crystal from being formed at the negative electrode. Thus, by increasing the charging current from the first preset current to the maximum current when the reference voltage decreases from the limiting voltage to the first preset voltage, and by limiting the time period during which the maximum current is applied to ensure the reference voltage does not exceed the limiting voltage, the charging speed can be improved while the charging safety is ensured at the same time.

In some embodiments, after the charging current is increased from the first preset current to the maximum current, when the reference voltage reaches the limiting voltage, the charging current can be reduced to a second preset current smaller than the first preset current, to cause the reference voltage to reduce below the limiting voltage. The reference voltage increases when the charging proceeds and increases faster with a larger charging current. Thus, when the reference voltage again reaches the limiting voltage, a charging current smaller than the first preset current, e.g., the second preset current, can be used for charging the battery to avoid overcharging. However, since the battery has been charged for a period of time, even the second preset current is used, the reference voltage will not decrease to the first preset voltage or to a voltage lower than the first preset voltage. Thus, when the reference voltage decreases to a second preset voltage lower than the limiting voltage but higher the first preset voltage, the charging current can be increased from the second preset current to the maximum current. As such, the charging speed can be improved while the charging safety is ensured at the same time.

In some embodiments, after the charging current is increased from the second preset current to the maximum current, the above-described processes can be repeated, with only the need to change the preset current and the preset voltage. For example, after the reference voltage reaches the limiting voltage again, the charging current can be reduced to a third preset current smaller than the second preset current, to cause the reference voltage to decrease below the limiting voltage. When the reference voltage decreases to a third preset voltage lower than the limiting voltage but higher than the second preset voltage, the charging current can be increased from the third preset current to the maximum current. Such a process can be repeated twice, three times, . . . , in a similar manner. The number of repeating times can depend on whether the battery is fully charged. When the battery is fully charged, i.e., when the reference voltage of the battery reaches the limiting voltage and does not decrease with decreasing the charging current, the charging process can be stopped.

Figure 11:
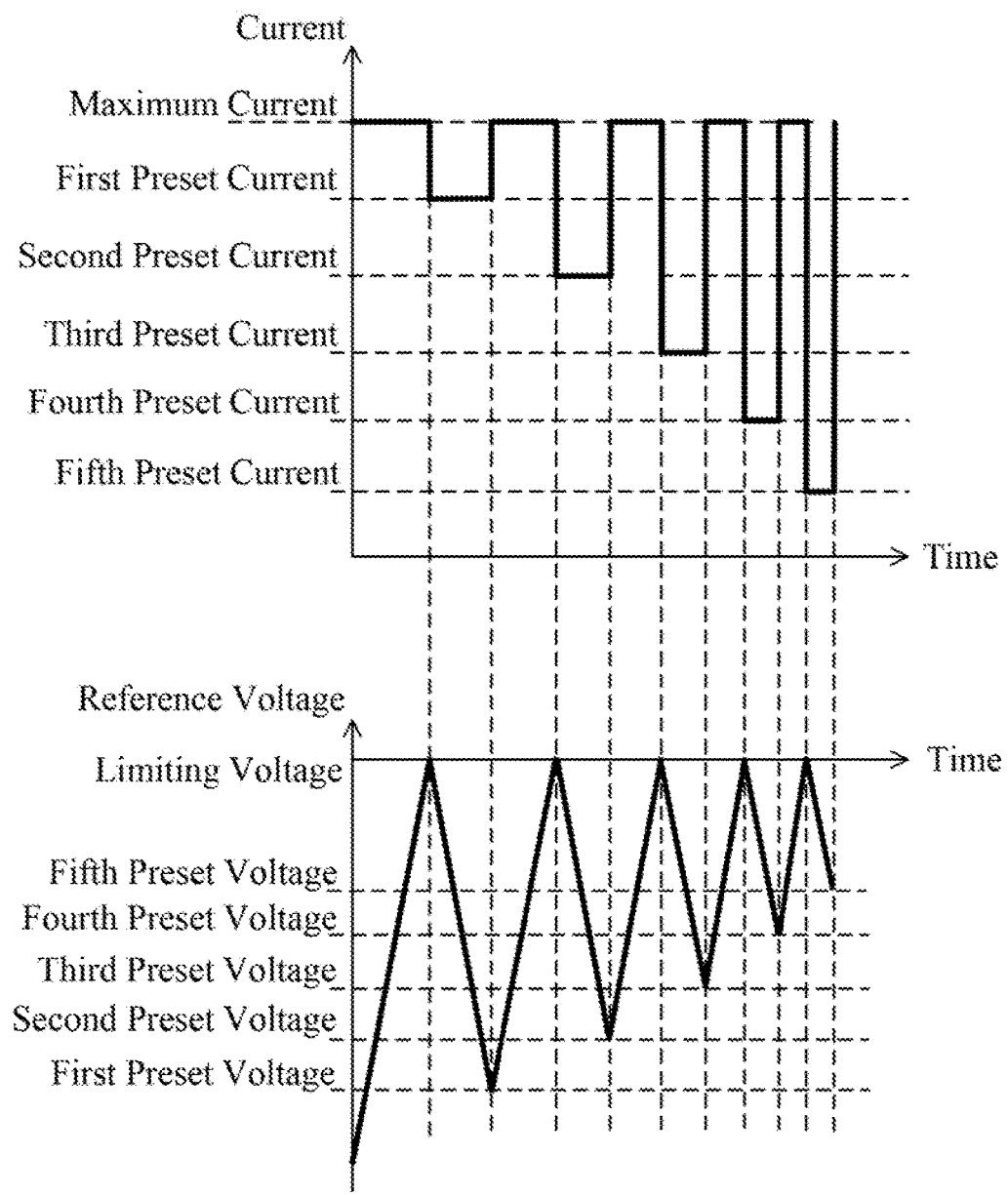
FIG. 11 shows charts illustrating an example of battery charging process consistent with some embodiments.

FIG. 11 shows charts that illustrate an example of the battery charging process described above. The battery can be an ordinary battery or a lithium-ion battery, such as a lithium-ion battery consistent with the embodiments, e.g., the lithium-ion battery 1000 shown in FIG. 10. When the battery is the lithium-ion battery 1000, the reference voltage can be, for example, the internal voltage between the negative electrode 2022 and the metal electrode 2023. The limiting voltage can be the threshold voltage between the negative electrode 2022 and the metal electrode 2023, which can be, for example, about 0V. The maximum current can be, for example, 5 A. As shown in FIG. 11, by using a step-like charging current not larger than the maximum current to charge the battery, the reference voltage can be prevented from exceeding the limiting voltage. Meanwhile, the reference voltage can quickly increase in a step-like form until the battery is fully charged.

Consistent with the embodiments, the maximum current can be used to charge the battery when the reference voltage is lower than the limiting voltage. As such, the charging speed can be improved.

Figure 12:
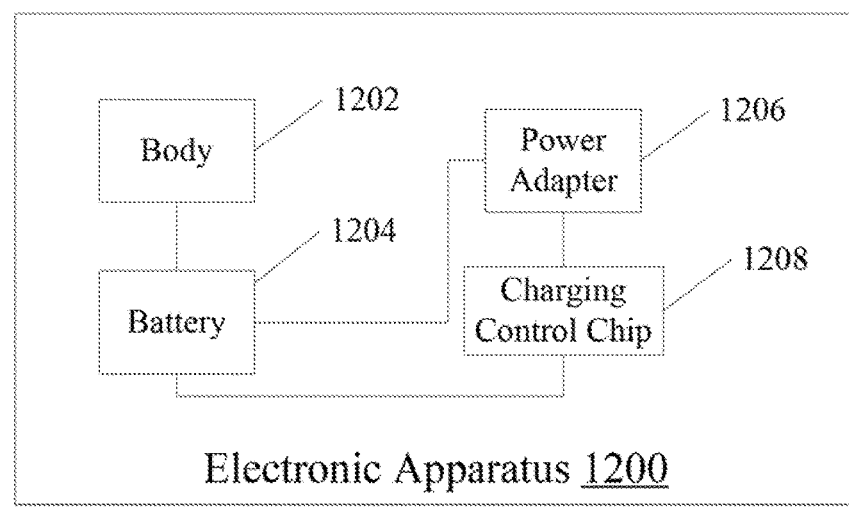
FIG. 12 is a block diagram of an example of electronic apparatus consistent with some embodiments.

Embodiments of the disclosure also provide an electronic apparatus. The electronic apparatus can be, for example, a terminal apparatus, such as a mobile phone, a tablet, a laptop, a ultra-mobile personal computer (UMPC), a netbook, or a personal digital assistant (PDA). FIG. 12 is a block diagram of an example of electronic apparatus 1200 consistent with some embodiments. As shown in FIG. 12, the electronic apparatus 1200 includes a body 1202, a battery 1204, a power adapter 1206, and a charging control chip 1208. The battery 1204 provides power to the body 1202, and is the same as or similar to any one of the examples of battery described above, and thus detailed description thereof is omitted. The power adapter 1206 can provide a charging current to the battery 1204, and the charging control chip 1208 can control the charging current provided by the power adapter 1206.

In some embodiments, the charging control chip 1208 can receive a suspension instruction generated by the protection circuit of the battery 1204. The suspension instruction can be generated when the internal voltage between the negative electrode plate of the battery and the first metal plate of the battery is higher than or equal to the threshold voltage. The charging control chip 1208 can execute the suspension instruction to cause the power adapter 1206 to stop powering the battery 1204, i.e., to stop providing the charging current to the battery 1204.

In some other embodiments, the charging control chip 1208 can receive a lowering instruction generated by the protection circuit of the battery 1204. The lowering instruction can be generated when the internal voltage between the negative electrode plate and the first metal plate is higher than or equal to the threshold voltage. The charging control chip 1208 can execute the lowering instruction to cause the power adapter 1206 to reduce the charging current provided to the battery 1204.

In some embodiments, the charging control chip 1208 can cause the charging current to be reduced from the maximum current to the first preset current when the internal voltage between the negative electrode plate and the first metal plate is higher than or equal to the threshold voltage, so as to cause the reference voltage of the battery 1204 to decrease below the limiting voltage of the battery 1204. The charging control chip 1208 can also cause the charging current to increase from the first preset current to the maximum current when the reference voltage decreases to the first preset voltage, which is lower than the limiting voltage.

In some embodiments, the charging control chip 1208 can cause the charging current to be reduced from the maximum current to the second preset current smaller than the first preset current when the internal voltage between the negative electrode plate and the first metal plate is higher than or equal to the threshold voltage, so as to cause the reference voltage to decrease below the limiting voltage. The charging control chip 1208 can also cause the charging current to increase from the second preset current to the maximum current when the reference voltage decreases to the second preset voltage, which is lower than the limiting voltage but higher than the first preset voltage.

In some embodiments, the electronic apparatus 1200 further includes at least one functional component (not shown) arranged on the body 1202. The functional component can include, for example, a central processing unit, a memory, a graphic processing chip, or a screen.

The implementations of the electronic apparatus 1200) are similar to those of the examples of battery described above, and thus detailed description thereof is omitted.

Figure 13:
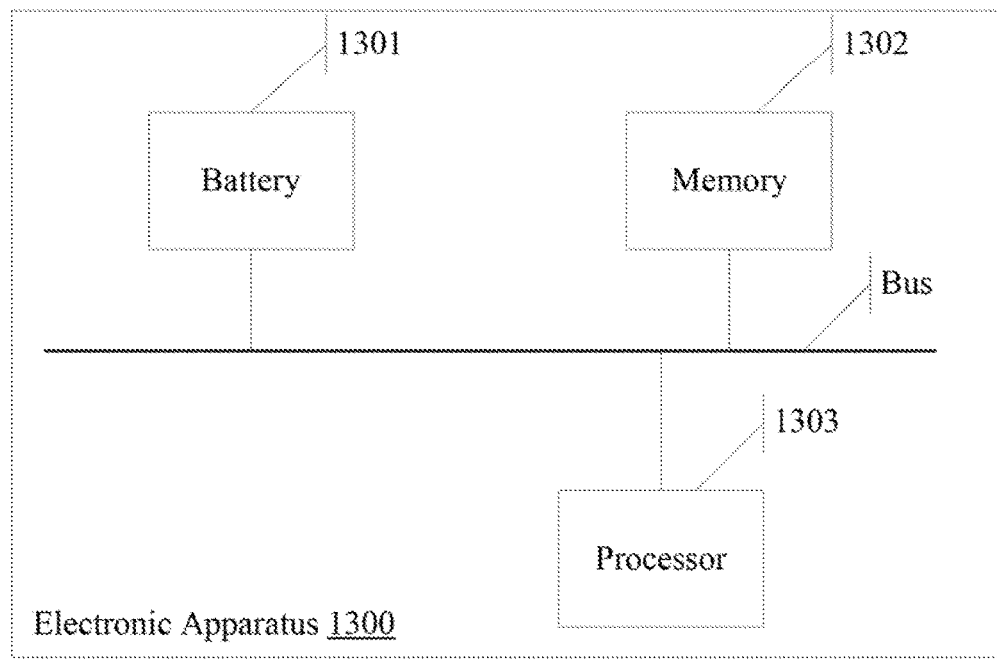
FIG. 13 is a block diagram of another example of electronic apparatus consistent with some embodiments.

FIG. 13 is a block diagram of another example of electronic apparatus 1300 consistent with some embodiments. The electronic apparatus 1300 includes a battery 1301, a memory 1302, and a processor 1303. In the example shown in FIG. 13, the battery 1301 is included as a part of the electronic apparatus 1300. The battery 1301 can also be provided as an external device, rather than being included in the electronic apparatus 1300. Further, in the example shown in FIG. 13, the battery 1301, the memory 1302, and the processor 1303 are coupled to each other via a bus. These components can also be coupled using other means. For example, the battery 1301 and the memory 1302 can be coupled to the processor 1303 via special cables, respectively.

The battery 1301 can be, for example, a battery consistent with the embodiments, such as one of the batteries described above.

The memory 1302 can include a non-transitory computer-readable storage medium and can be, for example, a read-only memory (ROM), a random access memory (RAM), or a disc memory. The memory 1302 can store program codes (instructions) that can be executed by the processor 1303. In some embodiments, multiple memories 1302 can be provided.

The processor 1303 can be, for example, a CPU, an application specific integrated circuit (ASIC), or one or more integrated circuits controlling execution of programs. The processor 1303 can execute the program codes stored in the memory 1302 to perform a method consistent with the embodiments, such as one of the charging methods described above.

For example, the processor 1303 can call the program codes stored in the memory 1302 and execute the program codes to acquire a charging current for charging the battery 1301 and monitor a reference voltage of the battery 1301 while the battery 1301 is being charged. The charging current can be provided by, for example, a power adapter of the electronic apparatus 1300. As described above, the reference voltage can be the battery voltage across the positive electrode plate and the negative electrode plate of the battery 1301, or the internal voltage between the negative electrode plate and the metal plate of the battery 1301. The reference voltage needs to be maintained to be lower than or equal to a limiting voltage to prevent the battery 1301 from being damaged. If the reference voltage is the battery voltage, the limiting voltage can be the maximum battery voltage of the battery 1301. If the reference voltage is the internal voltage, the reference voltage can be the threshold voltage between the negative electrode plate and the metal plate.

In some embodiments, the processor 1303 can determine whether the reference voltage is lower than the limiting voltage and, if so, increase the charging current to a maximum current, such as the largest current that the battery can sustain or the largest current that the power adapter can provide, to improve the charging speed of the battery 1301.

In some embodiments, after the charging current is increased to the maximum current, when the reference voltage equals the limiting voltage, the processor 1303 can reduce the charging current from the maximum current, to cause the reference voltage to reduce below the limiting voltage.

In some embodiments, when the reference voltage equals the limiting voltage, the processor 1303 can reduce the charging current from the maximum current to the first preset current smaller than the maximum current, to cause the reference voltage to reduce below the limiting voltage. In some embodiments, when the reference voltage decreases to the first preset voltage lower than the limiting voltage, the processor 1303 can increase the charging current from the first preset current to the maximum current.

In some embodiments, after the charging current is increased from the first preset current to the maximum current, when the reference voltage equals the limiting voltage, the processor 1303 can reduce the charging current from the maximum current to the second preset current smaller than the first preset current, to cause the reference voltage to reduce below the limiting voltage. In some embodiments, when the reference voltage decreases to the second preset voltage lower than the limiting voltage but higher than the first preset voltage, the processor 1303 can increase the charging current from the second preset current to the maximum current.

In some embodiments, the processor 1303 can set the initial value of the charging current at the beginning of the charging process to the maximum current.

The electronic apparatus 1300 can be used to, for example, execute the fast charging method shown in FIG. 9. Therefore, the description above with respect to the method shown in FIG. 9 can be referred to for the details of the operation of the electronic apparatus 1300).

Figure 14:
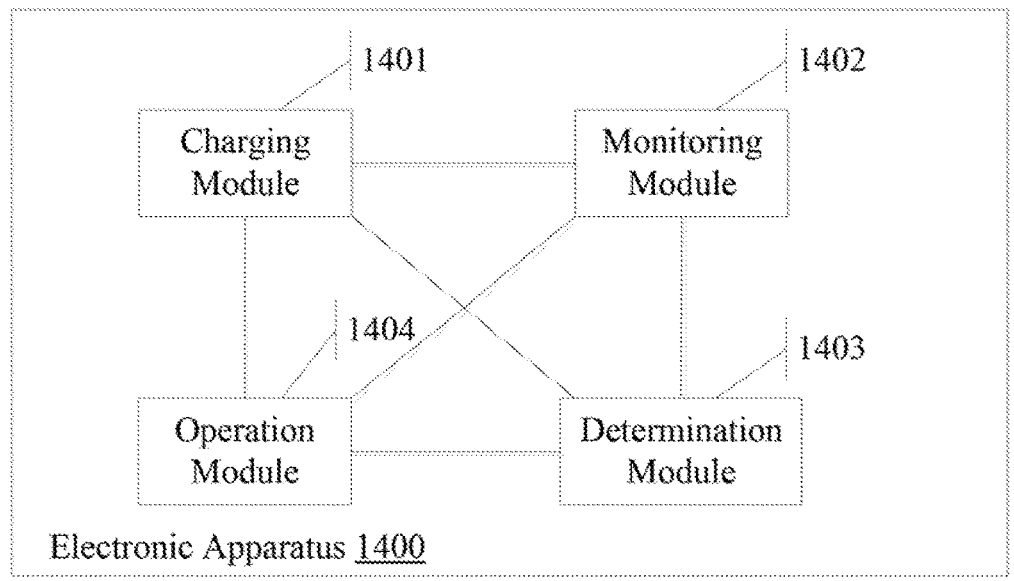
FIG. 14 is a block diagram of another example of electronic apparatus consistent with some embodiments.

FIG. 14 is a block diagram of another example of electronic apparatus 1400 consistent with some embodiments. The electronic apparatus 1400 and the electronic apparatus 1300 can be the same electronic apparatus or different electronic apparatuses. As shown in FIG. 14, the electronic apparatus 1400 includes a charging module 1401, a monitoring module 1402, a determination module 1403, and an operation module 1404.

The charging module 1401 can obtain a charging current for charging the battery of the electronic apparatus 1400. The battery can be included as a part of the electronic apparatus 1400, or can be a separate device. The charging current can be provided by, for example, a power adapter coupled to the electronic apparatus 1400. The battery can be, for example, a battery consistent with the embodiments, such as one of the batteries described above. The monitoring module 1402 can monitor a reference voltage of the battery while the battery is being charged. As described above, the reference voltage can be the battery voltage of the battery across the positive electrode plate and the negative electrode plate of the battery, or the internal voltage of the battery between the negative electrode plate and the metal plate of the battery. The reference voltage needs to be maintained to be lower than or equal to a limiting voltage of the battery to prevent the battery from being damaged. If the reference voltage is the battery voltage, the limiting voltage can be the maximum battery voltage of the battery. If the reference voltage is the internal voltage, the reference voltage can be the threshold voltage between the negative electrode plate and the metal plate. The determination module 1403 can determine whether the reference voltage is lower than the limiting voltage. If the reference voltage is lower than the limiting voltage, the operation module 1404 can increase the charging current to a maximum current, such as the largest current that the battery can sustain or the largest current that the power adapter can provide, to improve the charging speed of the battery.

In some embodiments, after the operation module 1404 increases the charging current to the maximum current, when the reference voltage equals the limiting voltage, the operation module 1404 can reduce the charging current from the maximum current, to cause the reference voltage to reduce below the limiting voltage.

In some embodiments, when the reference voltage equals the limiting voltage, the operation module 1404 can reduce the charging current from the maximum current to the first preset current smaller than the maximum current, to cause the reference voltage to reduce below the limiting voltage. In some embodiments, when the reference voltage decreases to the first preset voltage lower than the limiting voltage, the operation module 1404 can increase the charging current from the first preset current to the maximum current.

In some embodiments, after the operation module 1404 increases the charging current from the first preset current to the maximum current, when the reference voltage equals the limiting voltage, the operation module 1404 can reduce the charging current from the maximum current to the second preset current smaller than the first preset current, to cause the reference voltage to reduce below the limiting voltage. In some embodiments, when the reference voltage decreases to the second preset voltage lower than the limiting voltage but higher than the first preset voltage, the operation module 1404 can increase the charging current from the second preset current to the maximum current.

In some embodiments, the operation module 1404 can set the initial value of the charging current at the beginning of the charging process to the maximum current.

The electronic apparatus 1400 can be used to, for example, execute the fast charging method shown in FIG. 9. Therefore, the description above with respect to the method shown in FIG. 9 can be referred to for the details of the operation of the electronic apparatus 1400.

The embodiments also provide provides a non-transitory computer-readable storage medium storing program codes (instructions) corresponding to a fast charging method consistent with the embodiments. The program codes can be read by an electronic apparatus, such as a processor of the electronic apparatus, and cause the electronic apparatus (such as the processor of the electronic apparatus) to execute a method consistent with the embodiments, such as one of the methods described above.

For example, the program codes can cause the electronic apparatus to acquire a charging current to charge a battery. The charging current can be provided by a power adapter coupled to the electronic apparatus. The battery has a limiting voltage. The program codes can further cause the electronic apparatus to monitor a reference voltage of the battery while the battery is being charged, determine whether the reference voltage is lower than the limiting voltage, and increase the charging current to a maximum current when the reference voltage is lower than the limiting voltage, to improve the charging speed.

In some embodiments, the program codes can further cause the electronic apparatus to, after the charging current is increased to the maximum current and when the reference voltage equals the limiting voltage, reduce the charging current from the maximum current, to cause the reference voltage to reduce below the limiting voltage.

In some embodiments, the program codes can further cause the electronic apparatus to, when the reference voltage equals the limiting voltage, reduce the charging current from the maximum current to the first preset current smaller than the maximum current, to cause the reference voltage to reduce below the limiting voltage. In some embodiments, the program codes can further cause the electronic apparatus to, when the reference voltage decreases to the first preset voltage lower than the limiting voltage, increase the charging current from the first preset current to the maximum current.

In some embodiments, the program codes can further cause the electronic apparatus to, after the charging current is increased from the first preset current to the maximum current and when the reference voltage equals the limiting voltage, reduce the charging current from the maximum current to the second preset current smaller than the first preset current, to cause the reference voltage to reduce below the limiting voltage. In some embodiments, the program codes can further cause the electronic apparatus to, when the reference voltage decreases to the second preset voltage lower than the limiting voltage but higher than the first preset voltage, increase the charging current from the second preset current to the maximum current.

In some embodiments, the program codes can further cause the electronic apparatus to set the initial value of the charging current at the beginning of the charging process to the maximum current.

In the disclosure, the term "an embodiment" may include relevant features, structures, or characteristics that are not explicitly mentioned or described. Reference to, e.g., "an embodiment," "the embodiment," or "some embodiments," does not necessarily mean the same embodiment or embodiments. The features, structures, or characteristics can be combined as appropriate in one or more embodiments. The reference numerals used in the disclosure do not indicate or imply any particular sequence or order for executing the disclosed processes. The order of the processes should be determined based on their functions and internal logics.

Further, terms "include" and "comprise," and any other alternative forms of such terms, used in the disclosure intend to be nonexclusive. That is, a process, method, article, or device described as including certain elements does not only include the elements that are explicitly listed, but may also include other elements that are not explicitly listed or elements that are inherent to the process, method, article, or device. Other than being explicitly specified, an element following the phrase "including a" does not exclude the existence of another same element in the process, method, article, or device that includes the element.

The modules described above are merely an example of various module configurations. In actual application, the functions can be performed by various functional units. That is, the internal structure of an apparatus or device consistent with the embodiments can be divided to different functional units to perform some or part of the methods described above. The description of the above methods can be referred to for the operations of the system, apparatus, device, module, and unit.

The disclosed devices and methods can be implemented in other manners. The above-described servers and devices are merely examples. For example, different units may be defined merely according to their logical functions and can be defined according to a different manner. For example, multiple units or components can be combined or integrated into another system, or some features can be omitted or not executed. Further, the coupling, direct coupling, or communication connection between various components can be implemented by interfaces. The indirect coupling or communication connection between various devices or units can be electrical, mechanical, or another form.

Units described as separate components may or may not be physically separated from each other. A component described or shown as a unit may or may not be a physical unit. The units can be located in a same place or distributed on multiple network units. Some or all of the units can be chosen to realize purpose of the disclosure according to actual need.

Further, various functional units can be all integrated in one processing unit or be separate, individual units. Two or more units can be integrated in one unit. A unit can be implemented by hardware or by a combination of hardware and computer applications.

It is understood by persons of ordinary skill in the art that all or some of the processes consistent with the disclosure can be implemented by hardware as instructed by a program, which can be stored in a non-transitory computer-readable storage medium. The program, when executed, can cause, for example, a processor to perform a method consistent with the disclosure, such as one of the examples of the methods described above. The storage medium can include a medium that can store program codes, such as a mobile storage, a read only memory (ROM), a diskette, or a compact disc.

Further, software functional modules for implementing a method consistent with the disclosure can be stored in a non-transitory computer-readable storage medium. Thus, part or all of the technical solutions consistent with the disclosure can be implemented as computer software product stored in a storage medium. The software product may include instructions that can cause computer equipment, such as a personal computer, a server, or network equipment, or a processor to perform part or all of a method consistent with the disclosure. The storage medium can include a medium that can store program codes, such as a universal serial bus (USB) flash disk, a mobile storage, a ROM, a diskette, or a compact disc.

Other embodiments of the disclosure will be apparent to those skilled in the art from consideration of the specification and practice of the embodiments disclosed herein. It is intended that the specification and embodiments be considered as examples only and not to limit the scope of the disclosure, with a true scope and spirit of the invention being indicated by the following claims.

What is claimed is:

1. A battery comprising:
    a cell including:
        a core including a negative electrode plate, a metal plate, a separator, and a positive electrode plate arranged successively; and
        a sealing film enclosing the core; and
    a protection circuit coupled to the negative electrode plate and the metal plate to measure an internal voltage between the negative electrode plate and the metal plate.

2. The battery of claim 1, wherein the core includes a wound core.

3. The battery of claim 2, wherein the wound core is wound having one of a circular shape, an elliptical shape, or a shape consisting of arcs and straight lines.

4. The battery of claim 2, wherein the negative electrode plate, the metal plate, the separator, and the positive electrode plate are arranged successively from an inner side of the wound core to an outer side of the wound core.

5. The battery of claim 2, wherein the negative electrode plate, the metal plate, the separator, and the positive electrode plate are arranged successively from an outer side of the wound core to an inner side of the wound core.

6. The battery of claim 1, wherein:
the separator is a first separator, and
the core further includes a second separator, the positive electrode plate being arranged between the first separator and the second separator.

7. The battery of claim 1, wherein:
the separator is a first separator, and
the core further includes a second separator arranged between negative electrode plate and the metal plate.

8. The battery of claim 1, wherein:
the metal plate is a first metal plate, and
the core further includes a second metal plate arranged between the separator and the positive electrode plate.

9. The battery of claim 8, wherein:
the separator is a first separator; and
the core further includes a second separator arranged between the second metal plate and the positive electrode plate.

10. The battery of claim 1, wherein the metal plate is coupled to a ground terminal.

11. A charging method comprising:
acquiring a charging current for charging a battery;
determining whether an internal voltage of the battery is lower than a limiting voltage, the internal voltage being between a negative electrode of the battery and a metal plate in a core of the battery, and the metal plate being arranged between the negative electrode and a positive electrode of the battery; and
increasing, in response to the internal voltage being lower than the limiting voltage, the charging current to a maximum current.

12. The charging method of claim 11, further comprising:
measuring a battery voltage between the positive electrode and the negative electrode of the battery;
determining whether the battery voltage is lower than a maximum battery voltage sustainable by the battery; and
increasing, in response to the battery voltage being lower than the maximum battery voltage, the charging current to the maximum current.

13. The charging method of claim 11, wherein the limiting voltage is a threshold voltage at which an electric potential of the negative electrode is about 0V.

14. The charging method of claim 11, further comprising, when the internal voltage increases to the limiting voltage:
reducing the charging current to a preset current.

15. The charging method of claim 14, further comprising, when the internal voltage reaches a preset voltage lower than the limiting voltage:
increasing the charging current to the maximum current.

16. The charging method of claim 15,
wherein the preset current is a first preset current,
the method further comprising, when the internal voltage reaches the limiting voltage:
reducing the charging current to a second preset current smaller than the first preset current.

17. The charging method of claim 16,
wherein the preset voltage is a first preset voltage,
the method further comprising, when the internal voltage reaches a second preset voltage lower than the limiting voltage and higher than the first preset voltage:
increasing the charging current to the maximum current.

18. An electronic apparatus comprising:
a processor; and
a memory coupled to the processor and storing instructions that, when executed by the processor, cause the processor to:
acquire a charging current for charging a battery;
determine whether an internal voltage of the battery is lower than a limiting voltage, the internal voltage being between a negative electrode of the battery and a metal plate in a core of the battery, and the metal plate being arranged between the negative electrode and a positive electrode of the battery; and
increase, in response to the reference voltage being lower than the limiting voltage, the charging current to a maximum current.

19. The electronic apparatus of claim 18, wherein the instructions further cause the processor to:
measure a battery voltage between the positive electrode and the negative electrode of the battery;
determine whether the battery voltage is lower than a maximum battery voltage sustainable by the battery; and
increase, in response to the battery voltage being lower than the maximum battery voltage, the charging current to the maximum current.

20. The electronic apparatus of claim 18, wherein the limiting voltage is a threshold voltage at which an electric potential of the negative electrode is about 0V.

* * * * *